US007263632B2

(12) United States Patent
Ritz et al.

(10) Patent No.: US 7,263,632 B2
(45) Date of Patent: Aug. 28, 2007

(54) PROGRAMMATIC COMPUTER PROBLEM DIAGNOSIS AND RESOLUTION AND AUTOMATED REPORTING AND UPDATING OF THE SAME

(75) Inventors: Andrew Ritz, Sammamish, WA (US); Jee Fung Pang, Woodinville, WA (US); Jonathan Vines Smith, Maple Valley, WA (US); Michael Richard Fortin, Redmond, WA (US); Nicholas Stephen Judge, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 746 days.

(21) Appl. No.: 10/651,430

(22) Filed: Aug. 30, 2003

(65) Prior Publication Data

US 2004/0225381 A1 Nov. 11, 2004

Related U.S. Application Data

(60) Provisional application No. 60/468,772, filed on May 7, 2003.

(51) Int. Cl.
G06F 11/00 (2006.01)
(52) U.S. Cl. ..................................................... 714/25
(58) Field of Classification Search ................ 714/25, 714/47, 723
See application file for complete search history.

(56) References Cited

U.S. PATENT DOCUMENTS 5,495,573 A * 2/1996 Datwyler et al. ............. 714/48
6,212,653 B1 * 4/2001 Boivin et al. ................. 714/45
6,247,149 B1 * 6/2001 Falls et al. ................... 714/45
6,467,052 B1 * 10/2002 Kaler et al. .................. 714/39
6,738,832 B2 * 5/2004 Burr et al. ..................... 710/8
6,842,105 B1 * 1/2005 Henderson et al. ........ 340/5.73
7,043,661 B2 * 5/2006 Valadarsky et al. ............ 714/4
7,065,767 B2 * 6/2006 Kambhammettu et al. .. 719/310
7,120,685 B2 * 10/2006 Ullmann et al. ............ 709/224
2003/0005183 A1 * 1/2003 Burr et al. ..................... 710/1
2003/0065986 A1 * 4/2003 Fraenkel et al. .............. 714/47
2004/0059966 A1 * 3/2004 Chan et al. ................... 714/48
2004/0073844 A1 * 4/2004 Unkle et al. ................. 714/39
2004/0078683 A1 * 4/2004 Buia et al. .................... 714/37
2005/0210331 A1 * 9/2005 Connelly et al. ............. 714/26
2006/0174165 A1 * 8/2006 Shaffer et al. ................ 714/47

* cited by examiner

Primary Examiner—Robert Beausoliel
Assistant Examiner—Amine Riad
(74) Attorney, Agent, or Firm—Workman Nydegger (57) ABSTRACT

Programmatically diagnosing the root cause of a problem in a computing system. Events are monitored within an operating system, and at least a subset of the events are logged to a log file. In response to the detection of error condition (s), a diagnostics module is invoked. The diagnostics module queries the log file to correlate events relevant to diagnosis of the problem, and identifies the root cause by evaluating the results of the query. Once the root cause of the problem is diagnosed, a resolution module corresponding to that root cause may be invoked to programmatically resolve the problem. The invocation of the diagnostic and resolution modules may be subject to policy rules. Furthermore, the logging, diagnostics and resolution modules may be automatically updated as needed.

31 Claims, 3 Drawing Sheets

PROGRAMMATIC COMPUTER PROBLEM DIAGNOSIS AND RESOLUTION AND AUTOMATED REPORTING AND UPDATING OF THE SAME

CROSS-REFERENCE TO RELATED APPLICATIONS

The application claims priority to co-pending U.S. provisional patent application Ser. No. 60/468,772 filed May 7, 2003, which application is incorporated herein by reference in its entirety.

BACKGROUND OF THE INVENTION

1. The Field of the Invention

The present invention relates generally to software, and more particularly relates to systems and methods for programmatically determining root causes of problems that occur when operating a personal computer, and providing programmatic resolution and/or rich diagnostic data for users to address those problems.

2. Background and Related Art

Computing technology has transformed the way we work and play. In recent decades and years, computing technology has become quite complex. This complexity enables a computing system to perform a wide variety of high-complexity functions and applications thereby steadily improving the utility of the computing system. On the other hand, such complexity also makes it increasingly difficult for even the most skillful software engineers to develop software which is perfectly compatible and functional in all possible circumstances. Accordingly, even advanced computing systems often experience problems such as crashes, system hangs, or performance degradations.

Currently, it is difficult or impossible to easily diagnose or determine the root cause of many problems in computing systems. The computing system's operating system typically includes some limited mechanism for identifying the presence of a problem in the form of basic error messages. However, the error messages may not provide enough information to those attempting to diagnose and solve the root cause of the problem or to identify the workarounds for avoiding the problem.

Since many different applications and devices can run on an operating system at a given time, and since interoperability between such components can result in complex problems, it is often difficult for the operating system to determine which application, device driver, or configuration is the root cause of the problem that has surfaced. Interoperability can especially result in complex problems where the various interoperating components are provided by different venders. The problems may involve the operating system, applications, or device drivers, but once the problem has surfaced (e.g., via a system crash) it may be too late to provide any information that is useful in solving the problem. This problem is aggravated when the applications or device drivers executing on the operating system do not comply with programming guidelines for the operating system.

Furthermore, even if there is sufficient information with which to diagnose a problem, significant user effort is often needed in order to diagnose the root cause of the problem and provide a resolution. The requirement of significant user effort to diagnose and resolve computing system problems can degrade the user experience in working with the computing system, especially if the user expects fewer problems with the computing system.

Furthermore, many users are not experienced enough to diagnose and resolve computing system problems on their own. Accordingly, they may take actions they hope are corrective, but which may not resolve the problem due to an incorrect diagnosis or resolution of the problem. Such actions may actually further degrade the performance or stability of the computing system. Users may also solicit the help of others to diagnose and resolve the problem thereby incurring unnecessary costs in time or money on the user or the party that assists in resolving the problem.

For these reasons, a system and method that enables an operating system to better determine the root cause of computing system problems would be advantageous. Furthermore, a system and method that provides a programmatic means for addressing identified problems would be advantageous.

BRIEF SUMMARY OF THE INVENTION

The foregoing problems with the prior state of the art are overcome by the principles of the present invention, which is directed towards a system and method for programmatically diagnosing the root cause of a problem in a computing system. In one embodiment, the method includes monitoring events generated by appropriate instrumentation within an operating system, logging at least a subset of the events to a log file, and detecting one or more error conditions. In response thereto, a diagnostics module is invoked. The diagnostics module queries the log file for events relevant to diagnosis of the problem, and identifies the root cause by evaluating the results of the query. Once the root cause of the problem is diagnosed, a resolution module corresponding to that root cause may be invoked to programmatically resolve the problem.

User-defined or default policy rules may govern if and when a diagnosis module and/or resolution module is invoked. Accordingly, a computing system problem may be diagnosed and resolved programmatically thereby improving the user experience, while still allowing some degree of user control over the diagnosis and resolution process generally. In one embodiment, at least some of the query results are sent to an error reporting service, which returns one of more updates to the computing system. These updates modify which events are logged, how the diagnoses module diagnoses, and/or how the resolution module resolves.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention relates to mechanisms for programmatically diagnosing the root cause of a problem in a computing system. First, appropriate instrumentation is added to generate events to describe the state of execution of the tasks to be diagnosed. These events are monitored within an operating system, and at least some of the events are logged to a log file. In response to the detection of error condition(s), a diagnostics module is invoked. The diagnostics module queries the log file for events relevant to diagnosis of the problem, and identifies the root cause by evaluating the results of the query. Once the root cause of the problem is diagnosed, a resolution module corresponding to that root cause may be invoked to programmatically resolve the problem. The invocation of the diagnostic and resolution modules may be subject to policy rules. Furthermore, the detection, diagnostic and resolution modules may be automatically updated as needed by an update service.

Turning to the drawings, wherein like reference numerals refer to like elements, the invention is illustrated as being implemented in a suitable computing environment. The following description is based on illustrated embodiments of the invention and should not be taken as limiting the invention with regard to alternative embodiments that are not explicitly described herein.

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that the various acts and operations described hereinafter may also be implemented in hardware.

Figure 1:
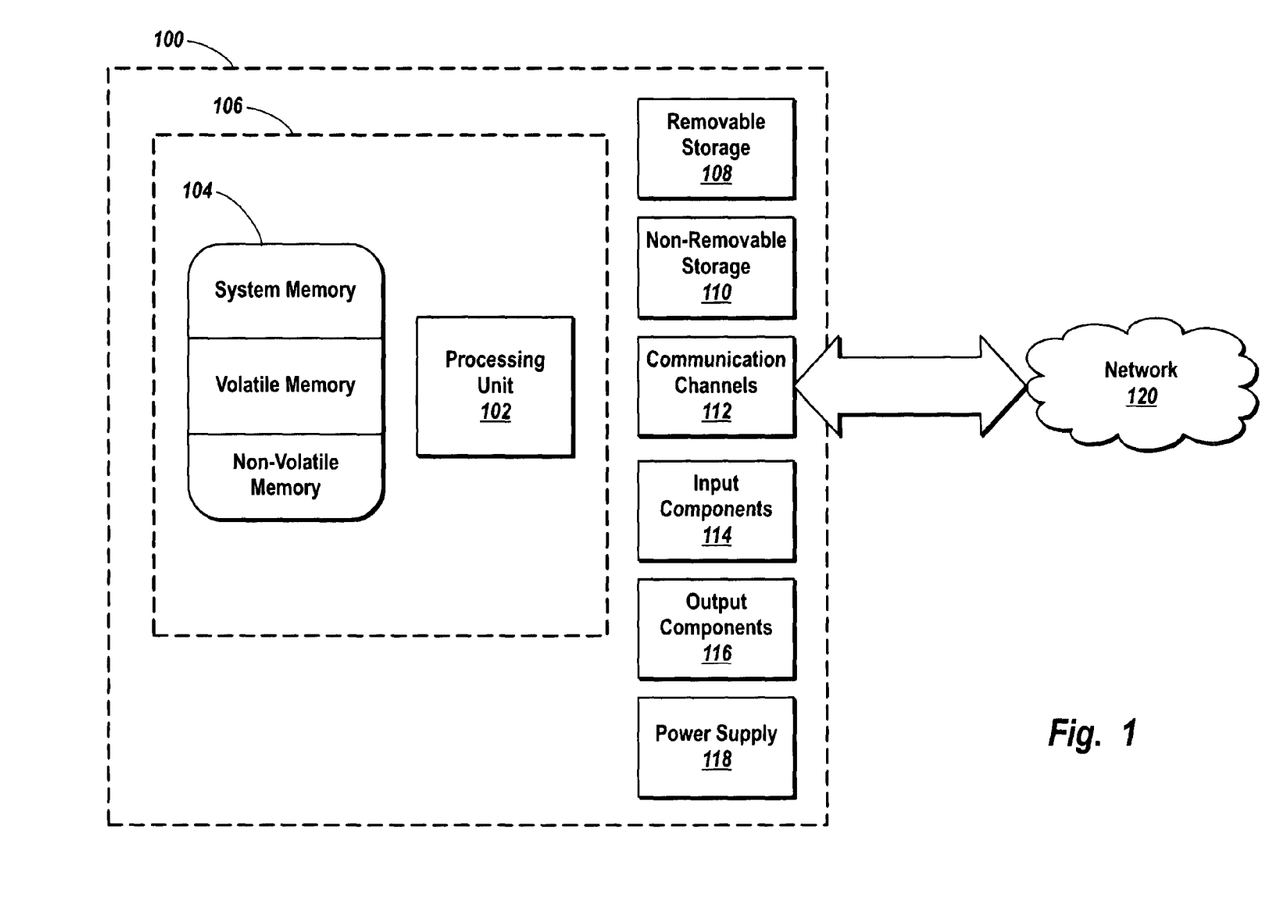
FIG. 1 illustrates a suitable computing system that may implement the features of the present invention.

Referring to FIG. 1, the present invention relates to the monitoring of software application and hardware reliability and availability. The software application resides on a computer that may have one of many different computer architectures. For descriptive purposes, FIG. 1 shows a schematic diagram of a sample computer architecture usable for these devices. The architecture portrayed is only one example of a suitable environment and is not intended to suggest any limitation as to the scope of use or functionality of the invention. Neither should the computing devices be interpreted as having any dependency or requirement relating to anyone or combination of components illustrated in FIG. 1.

The invention is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 100 typically includes at least one processing unit 102 and memory 104. The memory 104 may be volatile (such as RAM), non-volatile (such as ROM, flash memory, etc.), or some combination of the two. This most basic configuration is illustrated in FIG. 1 by the dashed line 106.

The storage media devices may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing device.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Computing device 100 may also contain communication channels 112 that allow the host to communicate with other devices. Communication channels 112 are examples of communications media. Communications media typically embody computer-readable instructions, data structures, program modules, or other data in a modulated data signal such as a carrier wave or other transport mechanism and include any information-delivery media. The term "modulated data signal" means a signal that has one or more of its characteristics set or changed in such a manner as to encode information in the signal. By way of example, and not limitation, communications media include wired media, such as wired networks and direct-wired connections, and wireless media such as acoustic, radio, infrared, and other wireless media. The term computer-readable media as used herein includes both storage media and communications media.

The computing device 100 may also have input components 114 such as a keyboard, mouse, pen, a voice-input component, a touch-input device, and so forth. Output components 116 include screen displays, speakers, printer, etc., and rendering modules (often called "adapters") for driving them. The computing device 100 has a power supply 118. All these components are well known in the art and need not be discussed at length here.

Figure 2:
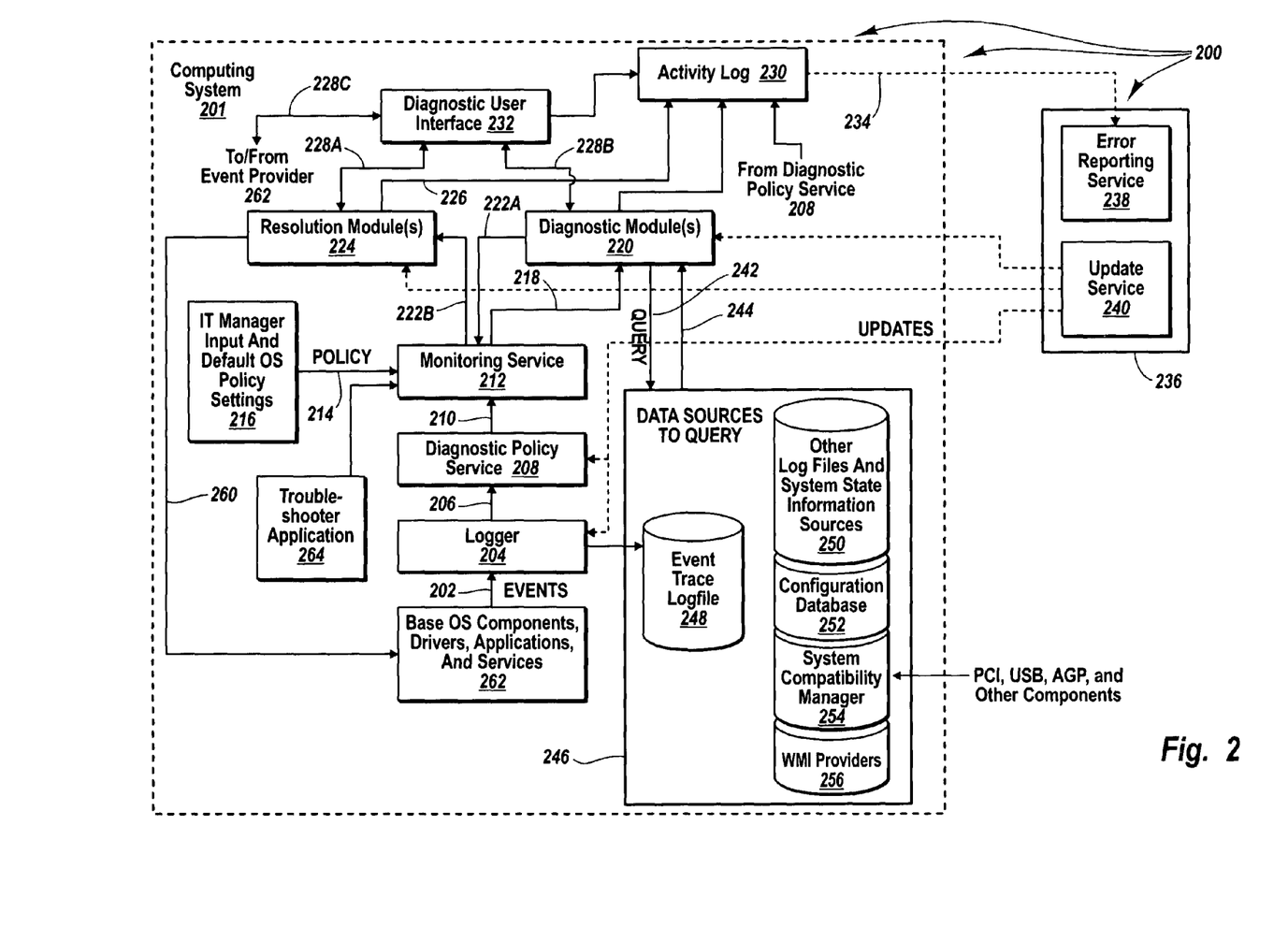
FIG. 2 illustrates a more specific architecture that may be used to implement the features of the present invention.

FIG. 2 illustrates a more specific architecture 200 that may be used to implement the features of the present invention. The architecture 200 includes a computing system 201 in communication with a remote computing system 236. However, the computing system 201 may also implement the features of the present invention even without the assistance of the remote computing system 236, albeit without the features of the update service described further below. Although not required, each of the computing systems 201 and 236 may be structured as described above with respect to the computing system 100.

Figure 3:
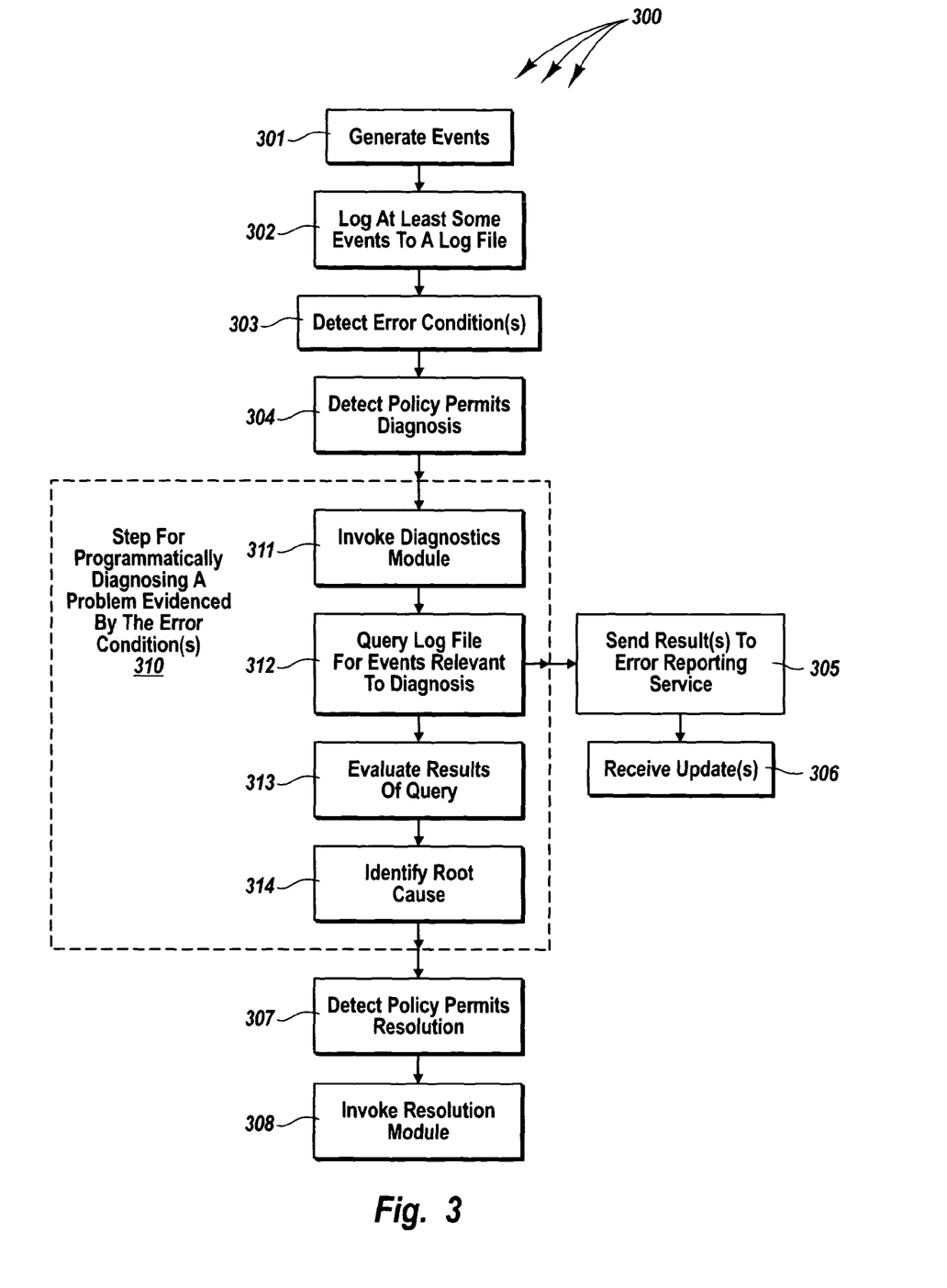
FIG. 3 illustrates a flowchart of a method for programmatically diagnosing and potentially resolving a problem in a computing system in accordance with the principles of the present invention.

FIG. 3 illustrates a flowchart of a method 300 for programmatically diagnosing and potentially resolving a problem in a computing system in accordance with the principles of the present invention. As the method 300 may be performed in the context of the architecture 200, FIGS. 2 and 3 will now be described with frequent reference to each other.

In FIG. 3, the method 300 includes an act of monitoring events within an operating system (act 301). Referring to FIG. 2, the monitored events are generated by a number of operating system (OS) components, drivers, applications, and services 262 which will also be collectively referred to herein as "event providers 262". The event providers 262 communicate events 202 to a logger 204. In one embodiment, the amount of data that is to be collected at any given point is bounded by the then existing circumstances. Thus, the logger 204 would deal with fewer events. Accordingly, any given event provider need not generate an event for every interaction it senses, but may generate only the more relevant events relating to root causes of problems. For example, an event need not be generated every time a disk drive writes to a sector. However, an event might be generated if the disk drive fails to respond to a read or write command, or attempts to write to a forbidden sector.

Examples of event providers 262 include software modules that manage power, Plug-and-Play (PnP) operation, memory management, bus control (e.g., PCI), and other low-level APIs (application programming interfaces). Other operating system components (or applications or drivers) may also raise events to the logger 204. Examples of the other operating system components include networking modules, graphics modules, audio modules, and printing modules.

Examples of the types of events 202 that are communicated to the logger 204 include user requests, system calls, device connections, communication requests, or the like. For example, one event may describe that a user has requested to put the computing system 201 into a low power or standby state, and subsequent events that will help the user or support engineer diagnose and resolve a standby failure in the event that the user's request does not succeed. For example, the standby failure may include what applications or drivers vetoed the request to be put into a low power state. However, any other events that are detectable by the operating system may be provided by the events provider 262 to the logger 204.

As the computing system 201 (specifically the logger 204) monitors the events (act 301), the logger 204 logs at least a subset of the events to a log file (act 302). For example, the event trace log file 248 represents an example of such a log file. The logger 204 is configured to log all or a portion of the events 202. Optionally, the logger may be configured to log those events that are more likely to be helpful with diagnosing a problem. The logger 204 also may notify the diagnostics policy service 208 of the events. The volume of events flowing to the diagnostics policy services 208 may be much lower than the volume of event flowing to the event trace log file 248 in some embodiments. For example, the logger 204 may simply notify the diagnostics policy service 208 when a transaction begins or ends, or when an error condition arises.

At some point while logging at least a subset of the monitored events (act 302), the computing system 201 detects one or more error conditions (act 303). Referring to FIG. 2, this may be accomplished by the diagnostics policy service 208. The diagnostics policy service 208 determines when an actual problem has occurred by, for example, detecting a predetermined single error condition, or by detecting a predetermined sequence of error conditions has arisen.

Once a problem is detected, the computing system 201 performs a functional, result-oriented step for programmatically diagnosing a problem evidenced by the one or more error conditions (step 310). This may include any corresponding acts for accomplishing this result. However, in the illustrated embodiment, this includes corresponding acts 311 through 314.

Prior to actually performing programmatic diagnosis by invoking a diagnostics module (act 311), the computing system 201 may consult rules to determine that the diagnostic module should be invoked according to the rules (act 304). Rules may be set by received user input instructions or perhaps by default. Accordingly, the diagnostics policy service 208 is indirectly coupled to the diagnostics module (s) 220 via a monitoring service 212.

The monitoring service 212 applies policy to filter which events are propagated up to invoke diagnostic module(s) 220 for root cause determination. Examples of when filtering of such events may be desirable include enterprise environments where an Information Technology (IT) manager or system administrator may prefer that the operating system not perform certain automatic root cause determination and/or problem resolutions actions automatically. For example, an IT manager may want to be informed that a problem has occurred, but have no automated root cause analysis or any automated resolution occur. Or, the IT manager may want root cause analysis to occur, but no automated resolution.

For example, one action that computing system 201 may undertake in response to determining a root cause problem may be to automatically install an updated device driver. Since updated device drivers may cause unexpected operational changes in some instances, an enterprise's IT manager may input 216 policy 214 to specify that the user may not be enabled or authorized to update device drivers. Another example of a policy that an IT manager may apply to monitoring service 212 is that no automatic problem resolution steps are to be taken. This would allow the user or IT manager to decide whether or not to perform the action instead of having computing system 201 perform the action automatically.

If its stored policy so permits, the monitoring service 212 invokes 218 an appropriate one of diagnostics module(s) 220 (act 311) when a particular set of one or more error conditions is detected by the diagnostics policy service 208.

Alternatively, the appropriate diagnostics module may be invoked directly by the diagnostic policy service 208, or by one of event providers 262 (e.g., in embodiments without a monitoring service 212). The computing system 201 may include multiple diagnostics modules, each for diagnosing the root cause of predetermined error conditions or predetermined sequences of error conditions.

When invoked, each diagnostics module is configured to query and correlate 242 relevant data sources to diagnose the problem evidenced by the one or more error conditions (act 312) to determine information about which events and/or state preceded the problem event. Such relevant data sources may include, for example, event trace log 248, a configuration database 252 such as a registry, system compatibility manager 254, WMI providers 256, and other data sources and log files 250.

Depending on the particular operating system implementation, other log files 250 (e.g., network status logs) and other data sources may be queried in addition to, or in lieu of the sources illustrated in the figure.

System compatibility manager 254 is a service that receives status and error messages from different subsystems (e.g., the PCI bus subsystem, the USB subsystem, and the AGP subsystem) and other bus drivers and driver stacks in the system regarding known hardware anomalies that require device specific workarounds in order to allow the hardware in question to function properly. Such workarounds may impact how the device functions and may, therefore, end up being the root cause of a problem perceived by the end user. WMI providers expose diagnostic information about hardware devices on the system.

The diagnostics module evaluates the results 244 of the query (act 313), and identifies the root cause of the one or more error conditions in response to the evaluation (act 314). This may be accomplished by running a diagnostics routine that corresponds to the error condition(s). Each of at least some of the diagnostics modules (as well as at least some of the resolution modules 224 and the diagnostic policy service 208) may have plug-in capability to allow for more minor modifications of the corresponding diagnostics module. More specifically in one embodiment, the diagnostics module 220 compares the query results 244 with a list of root cause associations. This completes the step for programmatically diagnosing a problem evidenced by the one or more error conditions (step 310).

If the query results 244 are associate with an identified root cause, the invoked diagnostics module 220 may invoke an appropriate resolution module 224 (act 308) to perform an identified resolution that corresponds to the identified root cause. The identified root cause for a problem is some problem that is known to exist. The queries are specifically made to diagnose whether that problem is present or not. The monitoring service 212 may once again allow for stored policy to determine whether the resolution module should be invoked according to the rules (act 307). Accordingly, the diagnostics modules may first notify 222A the monitoring service 212 of the root cause. If the stored policy so permits, the monitoring service 212 invokes 222B the appropriate resolution module 224. There may also be multiple resolution modules 224, each associated with a different set of one or more root causes. Each resolution module may also have plug-in capability to allow for minor modifications as needed.

Each resolution module 224 may be configured with error resolution routines that are invoked by the appropriate diagnostics module subject to the policy in monitoring service 212. Examples of error resolution routines include searching for and/or installing new device drivers, or disabling or reconfiguring conflicting device drivers or applications. In one embodiment, at least some of the routines are performed automatically (i.e., without requiring user input). Some resolution modules, however, may utilize user input that obtained by invoking 228 a diagnostic user interface module 232 (e.g., a "trouble shooting wizard"). The diagnostic user interface module 232 may be engaged to prompt the user to enter additional information to be used by the appropriate resolution module (or by the computing system as a whole) to attempt to identify or resolve the problem. This may be particularly useful when the root cause of the one or more error conditions cannot be programmatically identified and/or resolved without further user assistance.

The interaction between the resolution module(s) 224 and the diagnostic user interface 232 is represented by bi-directional arrow 228A. The interaction between the diagnostics module(s) 220 and the diagnostic user interface 232 is represented by bi-directional arrow 228B. The diagnostic user interface 232 may also allow user interaction 228C with the event generators 262 to modify what events are generated.

A trouble shooter application 264 provides a user interface that allows a user to expressly report a problem to the monitoring service 212, rather than wait for the diagnostic policy service 208 to detect the problem. The diagnostic modules 220 would then diagnose the root cause of the reported problem, followed by the resolution modules 224 resolving the problem.

On occasion, it may be advantageous to modify what events are logged, how a diagnostics module diagnoses, or how a resolution module resolves an identified root cause of a problem. For example, perhaps a diagnostics module cannot diagnose a problem based on the logged events, or perhaps a resolution module cannot properly resolve the problem without modification. Accordingly, information from the diagnostic policy service 208, the diagnostics modules 220, the resolution modules 224 and/or the diagnostic user interface module 232 may be conveyed to the activity log 230 for reporting to error reporting service 238 (act 305). For example, resolution module reports to the activity log 230 as represented by arrow 226.

The activity log 230 may also be displayed to a user to allow the user to view the problems detected, what the diagnosis is, and how the diagnosed problem was resolved. The activity log 230 may also be provided to a remote location to allow technical support to view the relevant facts without having to rely on the user to state the relevant facts. The activity log 230 may also be sent to the error reporting service 238 to assist in forming statistical information regarding what problems are generally occurring on user systems.

Update service 240 may be used to send updates to one or more of the modules of computing system 201 to be received by the computing system 201 (act 306). For example, update service 240 may update logger 204 with additional events or event sequences to store to event trace log file 248 to assist in resolving the root cause of a new problem that has been detected by error reporting service 238 or other sources of information regarding failures experienced by users. Update service 240 may also update the diagnostic policy service 208 to change how problems are detected. Update service 240 may also be used to update (change existing modules, provide new modules, or add or modify a plug in) one or more of diagnostics modules 220 and resolution modules 224 to reflect a new solution that has been determined for a particular problem. In one embodiment, update service 240 is operated by vender computing systems 236 and transmits updates the modules of computing system 201 via the Internet. Alternatively, a third party could provide custom changes or entirely new modules and configuration information.

If the error event does not have a known root cause associated with it, diagnostics module 220 will report this information to the activity log 230, which in turn sends an error report 234 to error reporting service 238.

If the vendor is able to determine the root cause from the information sent by activity log 230, the root cause association information and corresponding problem resolution information is information is sent to the computing system 201 via update service 240. If the vendor is unable to determine the root cause, the vendor may use update service 240 to instruct diagnostic policy service 204 to store additional event or state information to event trace log file 248. The resolution module 224 may likewise instruct 260 the logger to store additional events 224 in order to ensure that proper resolution is achieved. When the additional information is transmitted to the error reporting service 238 after the next occurrence of the problem, the additional information may enable the vendor to better identify the root cause of the problem.

The error report 234 may be sent even before a known root cause is diagnosed. Reporting the error at this early stage allows the update service 240 to update the diagnostic modules 220 and/or resolution modules 224 to be updated prior to attempting diagnosis and resolution. Alternatively, the error may be reported 234 after diagnosis, but before resolution. In that case, the update service 240 may update the specific resolution module dedicated to resolving the specifically diagnosed problem.

The diagnostic policy service 208, the diagnostic modules 220, and the resolution module 224 may be configured to report their activity to activity log 230 (e.g., an error was detected, a diagnostic module was invoked, the diagnostic module took certain steps, the root cause was found and is this, the root cause could not be determined, a resolution module was invoked, the resolution module took these steps, the problem was resolved, the problem was not resolved, and the like). This provides information to the vendor regarding whether the system is diagnosing problems and whether or not the problems are being resolved. This information may be valuable to the vendor because it may be used to determine if either the diagnostics module 220 or resolution module 224 needs to be updated. The information may also be useful for the vender in understanding which problems are most pervasive to the end user, thereby allowing the vender to act on that information. For example, the vender might respond by creating a new architecture to avoid the pervasive problems in the future.

The error report 234 may be sent even before a known root cause is diagnosed. Reporting the error at this early stage allows the update service 240 to update the diagnostic modules 220 and/or resolution modules 224 to be updated prior to attempting diagnosis and resolution. Alternatively, the error may be reported 234 after diagnosis, but before resolution. In that case, the update service 240 may update the specific resolution module dedicated to resolving the specifically diagnosed problem.

As note above, one example of an update that may be sent via update service 240 is a new problem resolution for resolution module 224. If a particular type of error has been identified, but the root cause is difficult to determine, an update may instruct an event provider or the logger to store more event information to event trace log file 248. This will allow diagnostics module 220 to send more detailed information to activity log 230, which sends the more detailed information to error reporting service. The additional information is likely to assist the vendor computing system 236 in determining the root cause and solution to the problem. In turn, new diagnostic and resolution modules can be downloaded to address the problem.

Accordingly, a mechanism is described that programmatically diagnoses and resolves problems subject to internal policy constraints. Furthermore, the mechanism updates itself as needed in order to better diagnose the root cause of error condition(s), and resolve the root cause.

What is claimed and desired secured by United States Letters Patent is:

1. In a computing system that executes an operating system, a method for programmatically diagnosing the root cause of a problem in the computing system, the method comprising the following:
   an act of generating events within an operating system;
   an act of logging at least a subset of the events to a log file;
   an act of detecting one or more error conditions, and thereafter;
   an act of invoking a diagnostic module in response to the act of detecting one or more error conditions, wherein the diagnostic module is configured to do the following when invoked:
      an act of querying the log file to correlate events relevant to diagnosis of the problem evidenced by the one or more error conditions;
      an act of evaluating the results of the query; and
      an act of identifying the root cause of the one or more error conditions in response to the evaluation; and
   an act of receiving one or more updates, wherein the updates modify which events are logged.

2. A method in accordance with claim 1, further comprising the following after the act of detecting one or more error conditions:
   an act of consulting rules to determine that the diagnostic module should be invoked according to the rules.

3. A method in accordance with claim 2, further comprising the following:
   an act of receiving user input to set the rules.

4. A method in accordance with claim 1, further comprising the following:
   an act of sending at least a subset of the results of the query to an error reporting service.

5. A method in accordance with claim 4, further comprising the following:
   an act of receiving one or more updates, wherein the updates alter how the diagnostics module diagnoses.

6. A method in accordance with claim 1, wherein the updates further alter how the diagnostic module diagnoses.

7. A method in accordance with claim 1, wherein the updates further alter how the diagnostics module diagnoses.

8. A method in accordance with claim 1, further comprising the following:
   an act of invoking a resolution module in response to the act of identifying the root cause of the one or more error conditions, the resolution module configured to do the following when invoked:
      an act of resolving the root cause of the one or more error conditions.

9. A method in accordance with claim 8, further comprising the following after the act of detecting one or more error conditions:
   an act of consulting rules to determine that the resolution module should be invoked according to the rules.

10. A method in accordance with claim 9, further comprising the following: an act of receiving user input to set the rules.

11. A method in accordance with claim 8, further comprising the following:
an act of sending at least a subset of the results of the query to an error reporting service.

12. A method in accordance with claim 11, wherein the updates further alter how the diagnostic module diagnoses.

13. A method in accordance with claim 12, wherein the updates further alter how the resolution module resolves.

14. A method in accordance with claim 11, wherein the updates alter how the diagnostic module diagnoses.

15. A method in accordance with claim 14, wherein the updates further alter how the resolution module resolves.

16. A method in accordance with claim 11, wherein the updates alter how the resolution module resolves.

17. A method in accordance with claim 1, further comprising the following:
an act of determining that the root cause of the one or more error conditions cannot be programmatically resolved; and
an act of engaging a user interface module to prompt the user to enter additional information to be used by the diagnostic or resolution module to attempt to identify or resolve the problem.

18. A method in accordance with claim 1, wherein the user interface module is a trouble shooting wizard.

19. A computer program product for use in a computing system that executes an operating system, the computer program product for implementing a method for programmatically diagnosing the root cause of a problem in the computing system, the computer program product comprising:
one or more computer-readable storage media having stored thereon computer-executable instructions that, when executed by one or more processors of the computing system, cause the computing system to perform the following:
an act of generating events within an operating system;
an act of logging at least a subset of the events to a log file;
an act of detecting one or more error conditions;
an act of invoking a diagnostic module in response to the act of detecting one or more error conditions, wherein the diagnostic module is configured to do the following when invoked:
an act of querying the log file to correlate events relevant to diagnosis of the problem evidenced by the one or more error conditions;
an act of evaluating the results of the query; and
an act of identifying the root cause of the one or more error conditions in response to the evaluation; and
an act of receiving one or more updates, wherein the updates modify which events are logged.

20. A computer program product in accordance with claim 19, wherein the one or more computer-readable storage media further have stored thereon computer-executable instructions that, when executed by the one or more processors, cause the computing system to performing the following:
an act of sending at least a subset of the results of the query to an error reporting service; and
an act of receiving one or more updates that alters how the diagnostic module diagnoses.

21. A computer program product in accordance with claim 19, wherein the one or more computer-readable storage media further have stored thereon computer-executable instructions that, when executed by the one or more processors, cause the computing system to performing the following:
an act of invoking a resolution module in response to the act of identifying the root cause of the one or more error conditions, the resolution module configured for resolving the root cause of the one or more error conditions when invoked.

22. A computer program product in accordance with claim 19, wherein the one or more computer-readable storage media further have stored thereon computer-executable instructions that, when executed by the one or more processors, cause the computing system to performing the following:
an act of sending at least a subset of the results of the query to an error reporting service; and
an act of receiving one or more updates that alters how the diagnostic module diagnoses; or alters how the resolution module resolves.

23. A computer program product in accordance with claim 19, wherein the one or more computer-readable storage media further have stored thereon computer-executable instructions that, when executed by the one or more processors, cause the computing system to performing the following:
an act of determining that the root cause of the one or more error conditions cannot be programmatically resolved; and
an act of engaging a user interface module to prompt the user to enter additional information to be used by the resolution module to attempt to identify or resolve the problem.

24. In a computing system that executes an operating system, a method for programmatically diagnosing the root cause of a problem in the computing system, the method comprising the following:
an act of generating events within an operating system;
an act of logging at least a subset of the events to a log file;
an act of receiving one or more updates, wherein the updates modify which events are logged;
an act of detecting one or more error conditions; and
a step for programmatically diagnosing a problem evidenced by the one or more error conditions.

25. A method in accordance with claim 24, wherein the step for programmatically diagnosing a problem evidenced by the one or more error conditions comprises the following:
an act of invoking a diagnostic module in response to the act of detecting one or more error conditions, wherein the diagnostic module is configured to do the following when invoked:
an act of querying the log file to correlate events relevant to diagnosis of the problem evidenced by the one or more error conditions; and
an act of evaluating the results of the query; and
an act of identifying the root cause of the one or more error conditions in response to the evaluation.

26. A computer-readable storage media having stored thereon computer-executable instructions that, when executed by one or more processors of a computing system, cause the computing system to instantiate in memory the following:
an event logger configured to log events in a log file and to receive updates which modify which events are logged in the log file;
a problem detection module configured to detect a problem when one or more error conditions occur, and configured to cause a resolution module to be invoked in at least some circumstances when the problem is detected; and a diagnosis module configured to query the log file, evaluate the results of the query, and diagnose the problem based on the evaluation.

27. A computer-readable storage media in accordance with claim 26, further having stored thereon computer-executable instructions that, when executed by the one or more processors cause the computing system to further instantiate in memory the following:

a monitoring module that maintains rules regarding when the diagnosis module should be invoked, wherein the monitoring module causes the diagnosis module to be invoked in response to the problem detection module detecting the problem if the rules so permit.

28. A computer-readable storage media in accordance with claim 26, further having stored thereon computer-executable instructions that, when executed by the one or more processors cause the computing system to further instantiate in memory the following:

a resolution module configured to resolve the problem when invoked, wherein the diagnosis module is further configured to cause the resolution module to be invoked in at least some circumstances when the diagnosis module diagnoses the problem.

29. A computer-readable storage media in accordance with claim 28, further having stored thereon computer-executable instructions that, when executed by the one or more processors cause the computing system to further instantiate in memory the following:

a monitoring module that maintains rules regarding when the resolution module should be invoked, wherein the monitoring module causes the resolution module to be invoked in response to the diagnosis module diagnosing the problem if the rules so permit.

30. In a computing system that executes an operating system and that is network connected to an error reporting service, a method for determining the root cause of a problem in the computing system, the method comprising the following:

an act of generating events within an operating system;

an act of logging at least a subset of the events to a log file;

an act of detecting one or more error conditions, and in response thereto:

an act of querying the log file to correlate relevant events, an act of sending at least a subset of the results of the query to an error reporting service; and an act of receiving one or more updates, wherein the updates modify which events are logged, what diagnostic steps are to be taken, or what resolution steps are taken by the computer system's operating system or recommended to the end user.

31. A computer program product for use in a computing system that executes an operating system and that is network connected to an error reporting service, the computer program product for implementing a method for determining the root cause of a problem in the computing system, the computer program product comprising:

one or more computer-readable storage media having stored thereon computer-executable instructions that, when executed by one or more processors of the computing system, cause the computing system to perform the following:

an act of generating events within an operating system;

an act of logging at least a subset of the events to a log file;

an act of detecting one or more error conditions, and in response thereto:

an act of querying the log file to correlate relevant events, an act of sending at least a subset of the results of the query to an error reporting service;

and an act of receiving one or more updates, wherein the updates modify which events are logged, what diagnostic steps are to be taken, or what resolution steps are taken by the computer.

* * * * *